United States Patent [19]

Sezaki et al.

[11] Patent Number: 6,078,313
[45] Date of Patent: Jun. 20, 2000

[54] INPUT CONTROL APPARATUS, DISPLAY CONTROL APPARATUS AND DISPLAY APPARATUS

[75] Inventors: Ken Sezaki, Ichikawa; Takehiro Ogihara, Tokyo, both of Japan

[73] Assignee: Tokyo Electron Limited, Tokyo, Japan

[21] Appl. No.: 08/899,168

[22] Filed: Jul. 23, 1997

[30] Foreign Application Priority Data

Jul. 30, 1996 [JP] Japan .................................. 8-200427

[51] Int. Cl.⁷ .............................. G09G 5/00; G09G 5/08; G08C 21/00
[52] U.S. Cl. .......................... 345/168; 345/156; 345/157; 178/18.01; 178/18.03
[58] Field of Search .................................. 345/123, 125, 345/156, 157, 159, 160, 162, 163, 168, 173; 341/22, 24, 25; 178/18.01, 18.02, 18.03, 18.06, 18.07

[56] References Cited

U.S. PATENT DOCUMENTS

| 5,371,846 | 12/1994 | Bates .................................... 345/123 |
| 5,424,730 | 6/1995 | Saselu et al. .............................. 341/25 |
| 5,557,299 | 9/1996 | Maynard et al. .......................... 341/24 |
| 5,825,349 | 10/1998 | Meier et al. ............................... 345/125 |

FOREIGN PATENT DOCUMENTS

| 4-310266 | 11/1992 | Japan . |
| 8-103739 | 4/1996 | Japan . |
| 8-153674 | 6/1996 | Japan . |

*Primary Examiner*—Vijay Shankar
*Attorney, Agent, or Firm*—Oblon, Spivak, McClelland, Maier & Neustadt, P.C.

[57] ABSTRACT

A touch panel type display apparatus includes an input controller having an input detector for detecting the start and end of an input period for a display panel, a reflecting circuit for reflecting the detection result of the input detector on a flag area, a notification circuit for notifying a display controller of the detection result, a period detector of detecting the elapse of a first period from the start of the input period on the basis of the recognition result of the flag area and repeatedly detecting the elapse of a second period shorter than the first period upon the elapse of the first period on the basis of the recognition result of the flag area, an input updating circuit for, when the end of the input period is detected before the first elapse of the second period, recognizing detection of the end of the input period as one input completion cycle, and when the input period continues after the first elapse of the second period, recognizing an input completion cycle every time the second period has elapsed. The display controller includes a receiver for receiving notification of the detection result from the input controller, a controller for controlling the display of the display panel according to the received detection result, and a reflecting circuit for reflecting the received detection result on the flag area.

19 Claims, 12 Drawing Sheets

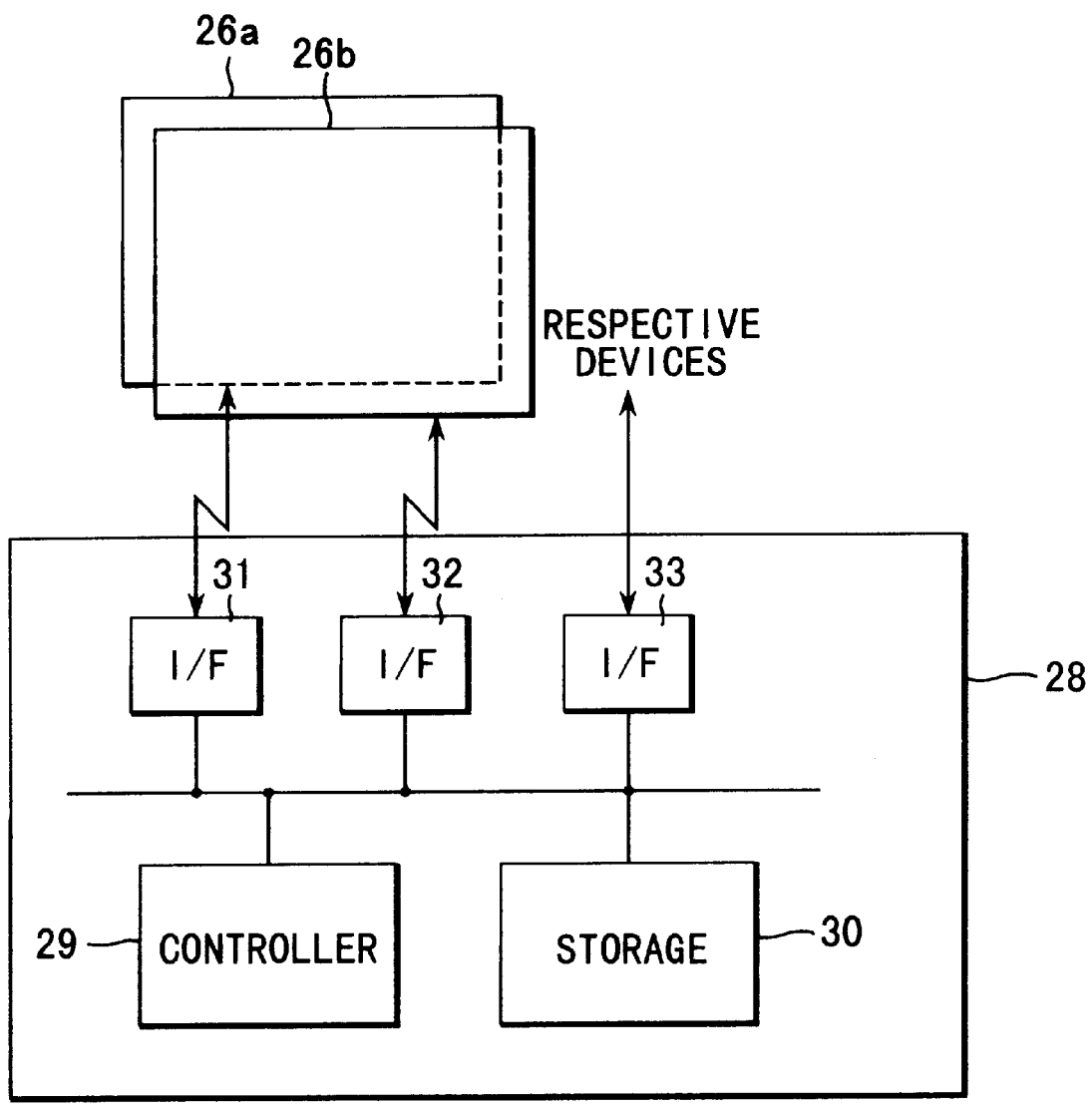
F I G. 4

H/W MONITOR

BLOCK UNIT NO. 2-2 COATER

| H/W NAME | VALUE | H/W NAME | VALUE |
|---|---|---|---|
| DI MAINTENANCE SWITCH | 28 | DI NOZZLE1 SENSOR | 28 |
| DI NOZZLE2 SENSOR | 28 | DI NOZZLE3 SENSOR | 28 |
| DI NOZZLE4 SENSOR | 28 | DI CUP SENSOR | 28 |
| DI EXHAUST ALARM (H) | 28 | DI EXHAUST ALARM (L) | 28 |
| DI CHUCK UP SENSOR | 28 | DI CHUCK DOWN SENSOR | 28 |
| DI NOZZLE FREE SENSOR | 28 | DI SHUTTER UP SENSOR | 28 |
| DI SHUTTER DOWN SENSOR | 28 | DI ARM1 UP SENSOR | 28 |
| DI ARM1 DOWN SENSOR | 28 | DI ARM2 UP SENSOR | 28 |
| DI ARM2 DOWN SENSOR | 28 | DI CHUCK VACUUM SENSOR | 28 |
| DI POSITION CONTROL JIG | 28 | DI MULTIPLEXER JIG | 28 |
| DI SPINNER TEMP. ERROR | 28 | DI SPIN STOP SW | 28 |
| DI SPIN STOP SW (LATCH) | 28 | DI FRONT DOOR OPEN | 28 |
| DO DO MS1 D0 | 28 | DO DO MS2 D0 | 28 |
| DO DO MS2 D1 | 28 | DO DO MS2 D2 | 28 |
| DO DO MS2 D3 | 28 | DO DO MS3 D0 | 28 |
| DO DO CHUCK UP | 28 | DO CHUCK DOWN | 28 |

WINDOW SELECTION

◀◀ ◀ ▶ ▶▶

END | CHANGE UNIT

FIG. 6

INPUT CONTROL APPARATUS, DISPLAY CONTROL APPARATUS AND DISPLAY APPARATUS

BACKGROUND OF THE INVENTION

The present invention relates to an input control apparatus, a display control apparatus, and a display apparatus used for the control unit of an equipment for manufacturing semiconductor devices.

For example, in the photolithography process of the semiconductor device manufacturing processes, a resist coating process for forming a resist film on the surface of a semiconductor wafer (to be referred to as a wafer hereinafter) and a developing process for developing the wafer after the wafer coated with the resist film is exposed. The resist coating process and the developing process are conventionally performed by a predetermined sequence in a composite process system equipped with the corresponding process machines.

Sequence control in this system is generally performed by a control unit using a personal computer or the like. The control unit is connected to a man-machine interface such as a touch panel type display. System configuration editing, monitor method setting, and the like in the above respective processes are performed through this display.

In system configuration editing, for example, a series of processes and the processing contents of each process are displayed in the form of, e.g., a table. All the sequence processes are not often displayed due to a limited display area of the display. In particular, this tendency is more pronounced in a system having the composite process described above because the system has a large number of processes. For this reason, some of the series of processes are displayed, and at the same time, the remaining processes can be displayed by a so-called scroll function or the like.

A conventional display has a table to be scrolled and scroll buttons. The scroll buttons include line scroll buttons and page scroll buttons. Upon clicking on one line scroll button, the lines on the immediately preceding page are scrolled and displayed. Upon clicking on the other line scroll button, the lines on the immediately succeeding page are scrolled and displayed. Upon clicking on one page scroll button, the preceding pages are sequentially scrolled and displayed. Upon clicking on the other page scroll button, the succeeding pages are sequentially scrolled and displayed.

To prevent continuous scrolling upon clicking on a wrong button a plurality of number of times consecutively, e.g., to prevent 2-line or 2-page scrolling upon clicking on a wrong button two times consecutively a predetermined interval for regulating click-on is defined between the first click-on of a given button and the second click-on of the given button. For example, if this interval is about 0.3 sec, the second click-on of the given button within 0.3 sec after the first click-on of the given button is not counted or is regarded as an invalid input.

This regulation prohibits continuous scrolling of a plurality of lines or pages. That is, in continuously scrolling the display contents by a plurality of lines or pages, the above button is consecutively clicked on a plurality of number of times. The click-on within the above interval cannot be counted, and scrolling cannot advance at a desired speed.

BRIEF SUMMARY OF THE INVENTION

It is an object of the present invention to provide an input control apparatus, a display control apparatus, and a display apparatus which allow smooth, continuous inputs while preventing an operation error caused by consecutive click-ons.

It is another object of the present invention to provide an input control apparatus, a display control apparatus, and a display apparatus which allow smooth, continuous inputs while preventing an operation error caused by consecutive click-ons even if an input control unit and a display control unit are separately present.

It is still another object of the present invention to provide an input control apparatus, a display control apparatus, and a display apparatus which allow smooth, continuous inputs properly using a commonly recognizable flag area while preventing an operation error caused by consecutive click-ons even if an input control unit and a display control unit are separately present and the input control unit and the display control unit have the flag area.

It is still another object of the present invention to provide an input control apparatus, a display control apparatus, and a display apparatus which allow smooth, continuous inputs while preventing an operation error caused by consecutive click-ons in a touch panel type display for performing scrolling in accordance with the number of times inputs are made using an input button while displaying the input button.

More specifically, the present invention provides an input control apparatus, a display control apparatus, and a display apparatus which allow smooth, continuous scrolling of a plurality of lines or pages.

Furthermore, the present invention provides an input control apparatus, a display control apparatus, and a display apparatus which allows continuous scrolling of a plurality of lines or pages at a higher speed, and appropriately displaying a desired portion.

According to the present invention, an input control apparatus comprises an input detector for detecting a start and end of an input period, a period detector for detecting an elapse of a first period from the start of the input period and repeatedly detecting an elapse of a second period upon the elapse of the first period, and a determining machine for determining that an input is complete with only one input operation when the end of the input period is detected before the first elapse of the second period, and determining that an input operation is made every elapse of the second period when the input period continues.

A display control apparatus comprises an input control unit for performing input control and a display control unit for performing display control, wherein the input control unit comprises an input detector for detecting a start and end of an input period, a notification machine for notifying the display control unit of a detection result of the input detector, a period detector for detecting an elapse of a first period from the start of the input period and repeatedly detecting an elapse of a second period shorter than the first period upon the elapse of the first period, and a determining machine for determining that an input is complete with only one input operation when the end of the input period is detected before the first elapse of the second period, and determining that an input operation is made every elapse of the second period when the input period continues, and the display control unit comprises a reception machine for receiving notification of the detection result from the input control unit and a controller for controlling display in accordance with the received notification of the detection result.

A display apparatus comprises a touch panel type display, an input control unit for performing input control of the display, a display control unit for performing display control of the display, and a flag area which can be commonly recognized by the input control unit and the display control unit, wherein the input control unit comprises an input detector for detecting a start and end of an input period, a reflecting machine for reflecting a detection result of the input detector on the flag area, a notification machine for notifying the display control unit of the detection result, a period detection machine for detecting an elapse of a first period from the start of the input period on the basis of a recognition result of the flag area and repeatedly detecting an elapse of a second period shorter than the first period upon the elapse of the first period on the basis of the recognition result of the flag area, and a determining machine for determining that an input is complete with only one input operation when the end of the input period is detected before the first elapse of the second period, and determining that an input operation is made every elapse of the second period when the input period continues, and the display control unit comprises a reception machine for receiving notification of the detection result from the input control unit, a controller for controlling display in accordance with the received notification of the detection result, and a reflecting machine for reflecting the received detection result on the flag area.

A display apparatus comprises a touch panel type display, an input control unit for performing input control of the display, a display control unit for performing display control of the display, and a flag area which can be commonly recognized by the input control unit and the display control unit, wherein the input control unit comprises input detection means for detecting a start and end of an input period, a reflecting machine for reflecting a detection result of the input detector on the flag area when the end of the input period is detected, a notification machine for notifying the display control unit of the detection result, a period detector for detecting an elapse of a first period from the start of the input period on the basis of a recognition result of the flag area and repeatedly detecting an elapse of a second period shorter than the first period upon the elapse of the first period on the basis of the recognition result of the flag area, and a determining machine for determining that an input is complete with only one input operation when the end of the input period is detected before the first elapse of the second period, and determining that an input operation is made every elapse of the second period when the input period continues, and the display control unit comprises a reception machine for receiving notification of the detection result from the input control unit, a controller for controlling display in accordance with the received notification of the detection result, and a reflecting machine for reflecting the received detection result on the flag area when the received detection result represents the start of the input period.

Additional objects and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a block diagram showing the control unit of the coating/developing process system shown in FIG. 1;

FIG. 6 is a view showing the hardware monitor window of the display in the coating/developing process system shown in FIG. 1;

DETAILED DESCRIPTION OF THE INVENTION

Figure 1:
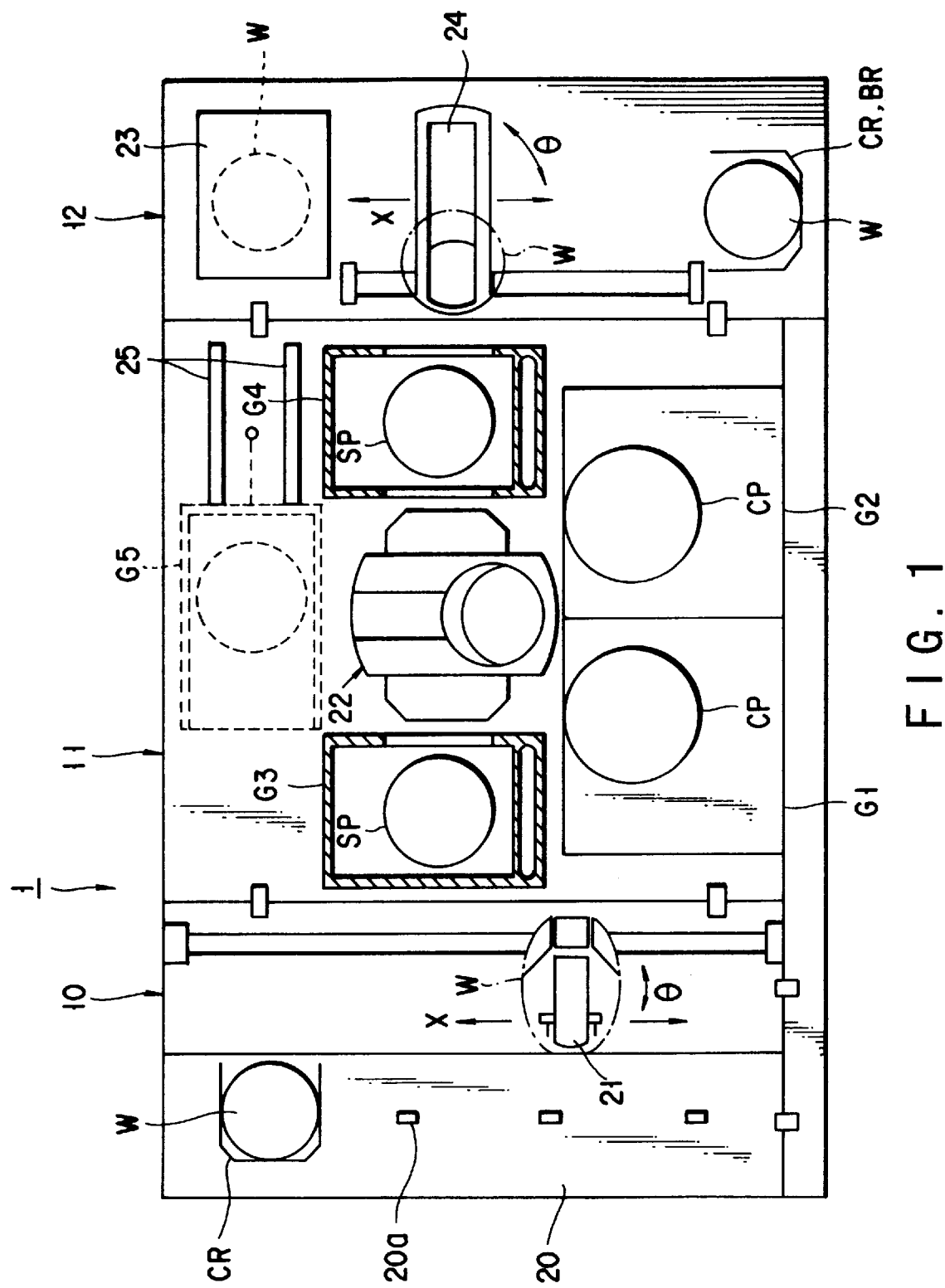
FIG. 1 is a plan view showing the overall arrangement of a semiconductor wafer coating/developing process system to which an embodiment of the present invention is applied.
Figure 2:
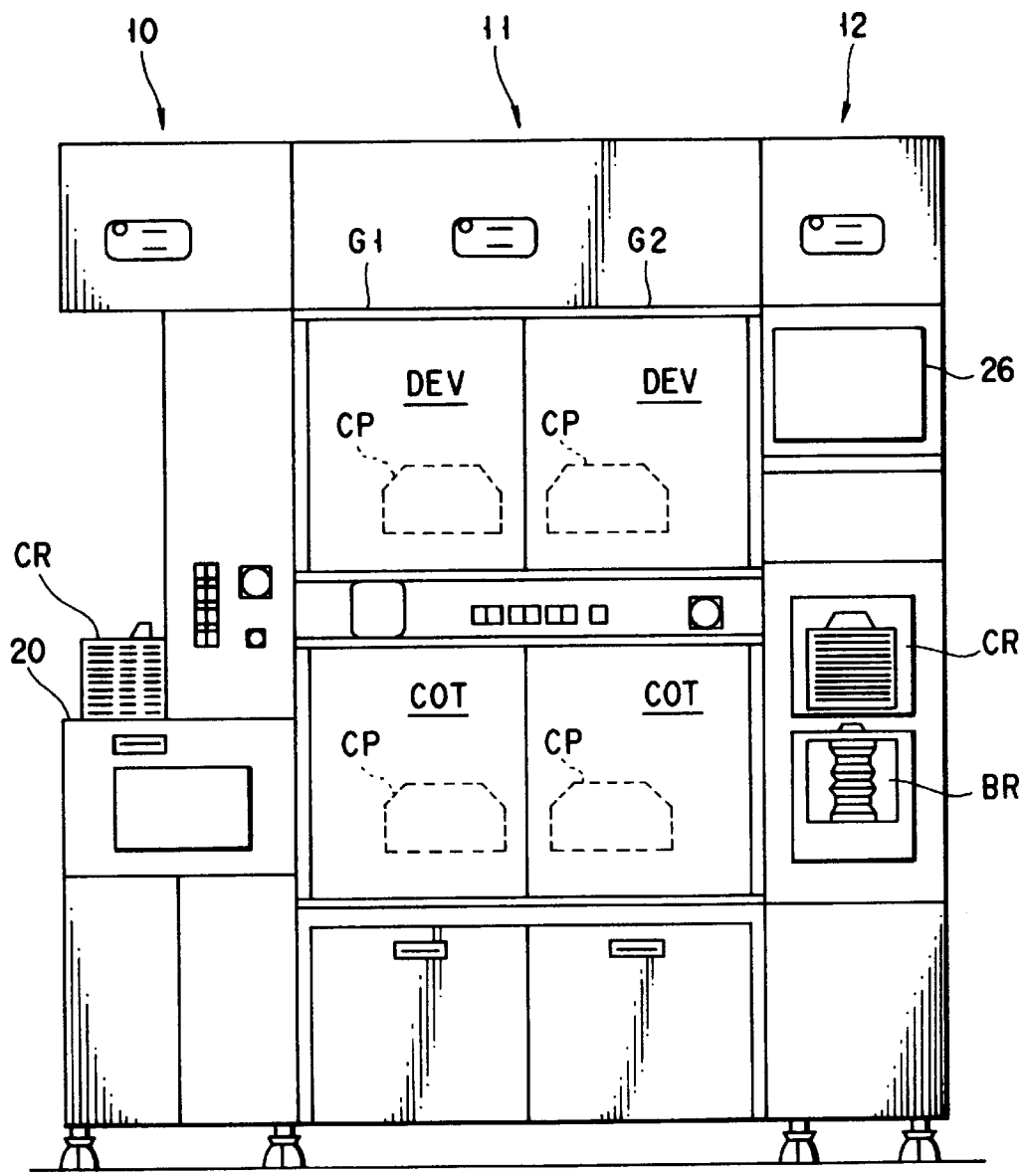
FIG. 2 is a front view of the coating/developing process system shown in FIG. 1.
Figure 3:
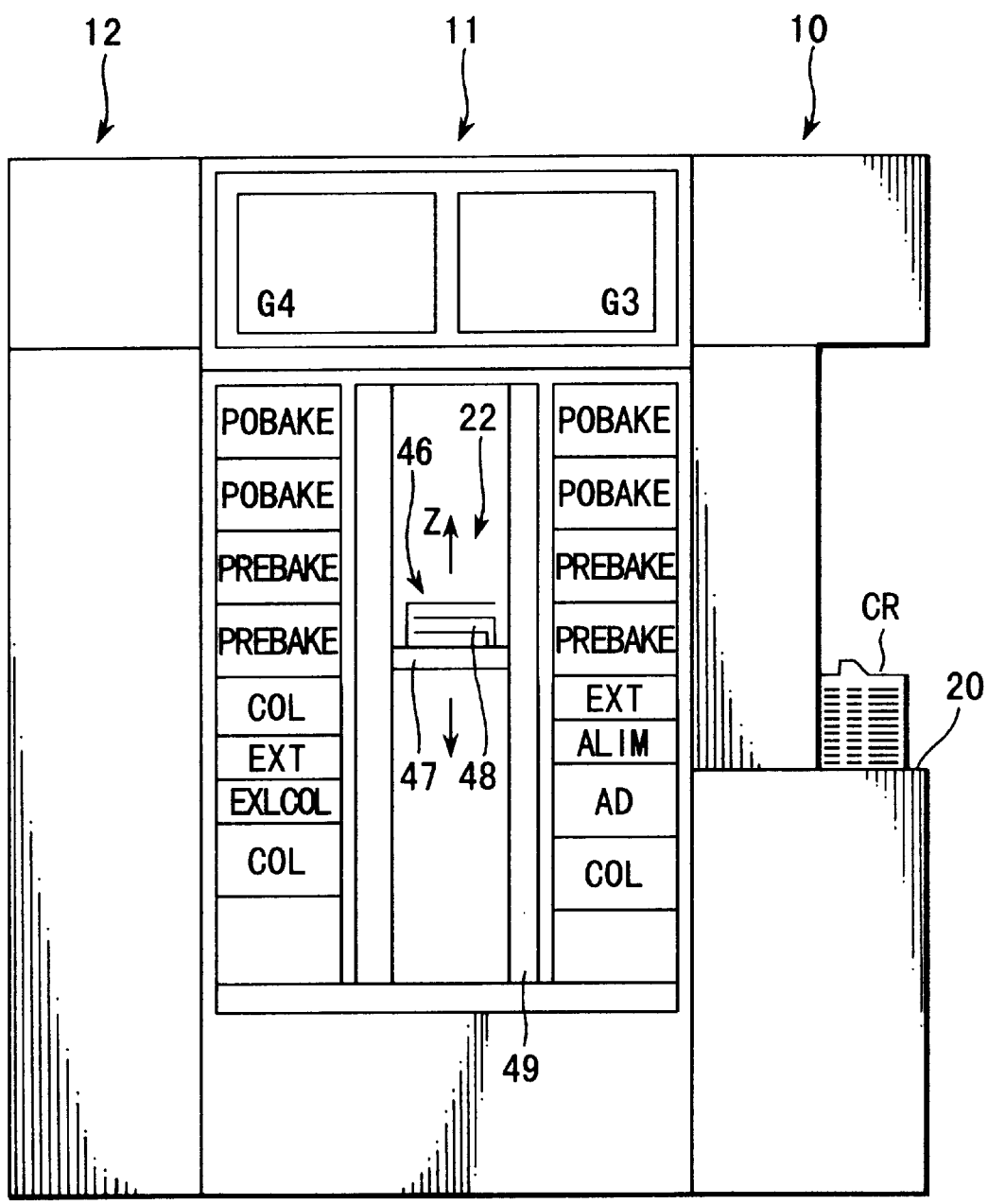
FIG. 3 is a rear view of the coating/developing process system shown in FIG. 1.

FIGS. 1 to 3 show the overall arrangement of a coating/developing process system 1 for a semiconductor wafer (to be referred to as a wafer hereinafter). The coating/developing process system 1 integrally comprises a cassette station 10, a process station 11, and an interface section 12. The cassette station 10 loads/unloads in/from the system a plurality of wafers w, e.g., 25 wafers serving as target substrates in a wafer cassette CR, or loads/unloads each wafer w in/from the wafer cassette CR. In the process station 11, various wafer process machines each for performing a predetermined process for each wafer w in the coating/developing process are arranged at predetermined positions in a multi-level manner. The interface section 12 exchanges the wafer w with an exposure device (not shown) arranged adjacent to the process station 11.

As shown in FIG. 1, in the cassette station 10, a plurality of wafer cassettes CR, e.g., a maximum of four wafer cassettes are placed linearly in the X direction (vertical direction in FIG. 1) at the positions of positioning projections 20a on a cassette table 20 such that the wafer inlets/outlets of the cassettes CR face the process station 11. A wafer conveyor 21 movable in the cassette array direction (X direction) and the wafer array direction (Z direction; vertical direction) of wafers stored in the wafer cassettes CR is arranged to selectively access the wafer cassettes CR.

The wafer conveyor 21 is arranged to be rotatable in the θ direction and can also access an alignment machine (ALIM) and an extension unit (EXT) which belong to the multi-stage unit section of a third process machine group G3 on the process station 11 side (to be described later).

As shown in FIG. 1, a vertical transport type main wafer transport mechanism 22 having a wafer transport device is arranged in the process station 11, and one or a plurality of multi-stage process machines are arranged around the main wafer transport mechanism 22.

As shown in FIG. 3, the main wafer transport mechanism 22 has a wafer transport device 46 vertically (Z direction) movable in a cylindrical support 49. The cylindrical support 49 is connected to the rotating shaft of a motor (not shown) and rotates together with the wafer transport device 46 about the rotating shaft upon being driven by the motor. The wafer transport device 46 is rotatable in the θ direction accordingly. Note that the cylindrical support 49 may be connected to another rotating shaft (not shown) rotated by the motor.

The wafer transport device 46 comprises a plurality of holding members 48 movable back and forth with respect to a transport base 47. The wafer w is exchanged between the adjacent process machines by these holding members 48.

In this embodiment, five process machine groups, i.e., the group G3 and groups G1, G2, G4, and G5 can be arranged. The multi-stage units of the first and second process machine groups G1 and G2 are arranged on the front surface (lower side of the drawing sheet in FIG. 1) side, the multi-stage units of the third process machine group G3 are arranged adjacent to the cassette station 10, the multi-stage units of the fourth process machine group G4 are arranged adjacent to the interface section 12, and the multi-stage units of the fifth process machine group G5 are arranged on the rear surface side.

As shown in FIG. 2, in the first process machine group G1, two spinner type process machines each for placing a wafer w on a spin chuck in a cup CP, e.g., a resist coating machine (COT) and a developer machine (DEV) are stacked upward in this order. In the second process machine group G2 as well, two spinner type process machines each for placing a wafer w on a spin chuck in a cup CP, e.g., a resist coating machine (COT) and a developer machine (DEV) are stacked upward in this order. These resist coating machines (COTs) are preferably arranged under the corresponding developer machines because the waste resist solution is hard to handle in view of mechanism and maintenance. However, each resist coating machine can be arranged on the corresponding developer machine, as needed.

As shown in FIG. 3, in the third process machine group G3, for example, eight open type process machines each for placing a wafer w on a susceptor SP to perform a predetermined process, e.g., a cooling machine (COL) for performing a cooling process, an adhesion machine (AD) for performing an adhesion process to increase the fixing strength of a resist, an alignment machine (ALIM) for performing positioning, an extension machine (EXT), two pre-baking machines (PREBAKES) each for performing a baking treatment before an exposure process, and two post-baking machines (POBAKEs) each for performing a baking treatment after the exposure process, are stacked upward in this order. In the fourth process machine group G4, eight open type process machines such as a cooling machine (COL), an extension/cooling machine (EXTCOL), an extension machine (EXT), a cooling machine (COL), two pre-baking machines (PREBAKEs), and two post-baking machines (POBAKEs) are stacked upward in this order.

As described above, in the fourth process machine group G4, the cooling machine (COL) and the extension/cooking machine (EXTCOL) which have lower process temperatures are arranged in the lower stage, while the pre-baking machines (PREBAKEs), the post-baking machines (POBAKEs), and the adhesion machine (D) which have higher process temperatures are arranged in the upper stage. This can eliminate thermal interference between the machines. These machines may be arranged at random as multi-stage units, as a matter of course.

The interface section 12 has a size equal to that of the process station 11 in the direction of depth (X direction) but has a size much smaller than that of the process station 11 in the widthwise direction. A transportable pickup cassette CR and a stationary buffer cassette BR are stacked on the front surface side of the interface section 12, while a peripheral exposure device 23 is arranged on the rear surface side of the interface section 12. A wafer conveyor 24 is arranged at the center of the interface section 12. The wafer conveyor 24 can move in the X and Z directions to access the cassettes CR and BR and the peripheral exposure device 23. The wafer conveyor 24 is rotatable in the θ direction and can also access the extension machine (EXT) belonging to the multi-stage units of the fourth process machine group G4 on the process station 11 side and an adjacent wafer transfer table (not shown) on the exposure machine side.

In the coating/developing process system 1, the multi-stage units of the fifth process machine group G5 indicated by the broken lines in FIG. 1 can be arranged on the rear surface side of the main wafer transport mechanism 22. The multi-stage units of the fifth process machine group G5 can shift laterally along guide rails 25 when viewed from the main wafer transport mechanism 22. Even if the multi-stage units of the fifth process machine group G5 are arranged, as illustrated in FIG. 1, they can slide along the guide rails 25 to assure the space for maintenance of the main wafer transport mechanism 22 from the rear side. The multi-stage units of the fifth process machine group G5 need not slide and shift linearly along the guide rails 25, but can pivot and shift outside the system, as indicated by the chain-line double-headed arrow in FIG. 1. This easily assures the space for maintenance of the main wafer transport mechanism 22.

A touch panel type display 26 serving as a main-machine interface connected to a control unit (to be described later) is arranged at the upper middle portion of the front surface side of the interface section 12. System configuration editing, monitor method setting, and the like in each process described above are performed at the display 26. In system configuration editing, for example, a series of processes and the processing contents of each process are displayed on the display 26 in the form of, e.g., a table. The user selects a predetermined command in accordance with the display contents to edit the system configuration. The user inputs commands or data by touching the display 26 with a fingertip. However, the commands or data can be input using a keyboard, a mouse, or the like.

The control unit of the coating/developing process system 1 having the above arrangement will be described below. FIG. 4 is a block diagram showing the arrangement of this control unit.

As shown in FIG. 4, a control unit 28 comprises a controller 29 for controlling the entire system and a storage 30 storing control programs and the like. The control unit 28 is connected to input devices 26a and 26b of the display 26 and the respective devices such as motors of the coating/developing process system 1 through interfaces (I/F) 31, 32, and 33.

The windows displayed on the display 26 will be described with reference to FIGS. 5 to 7.

Figure 5:
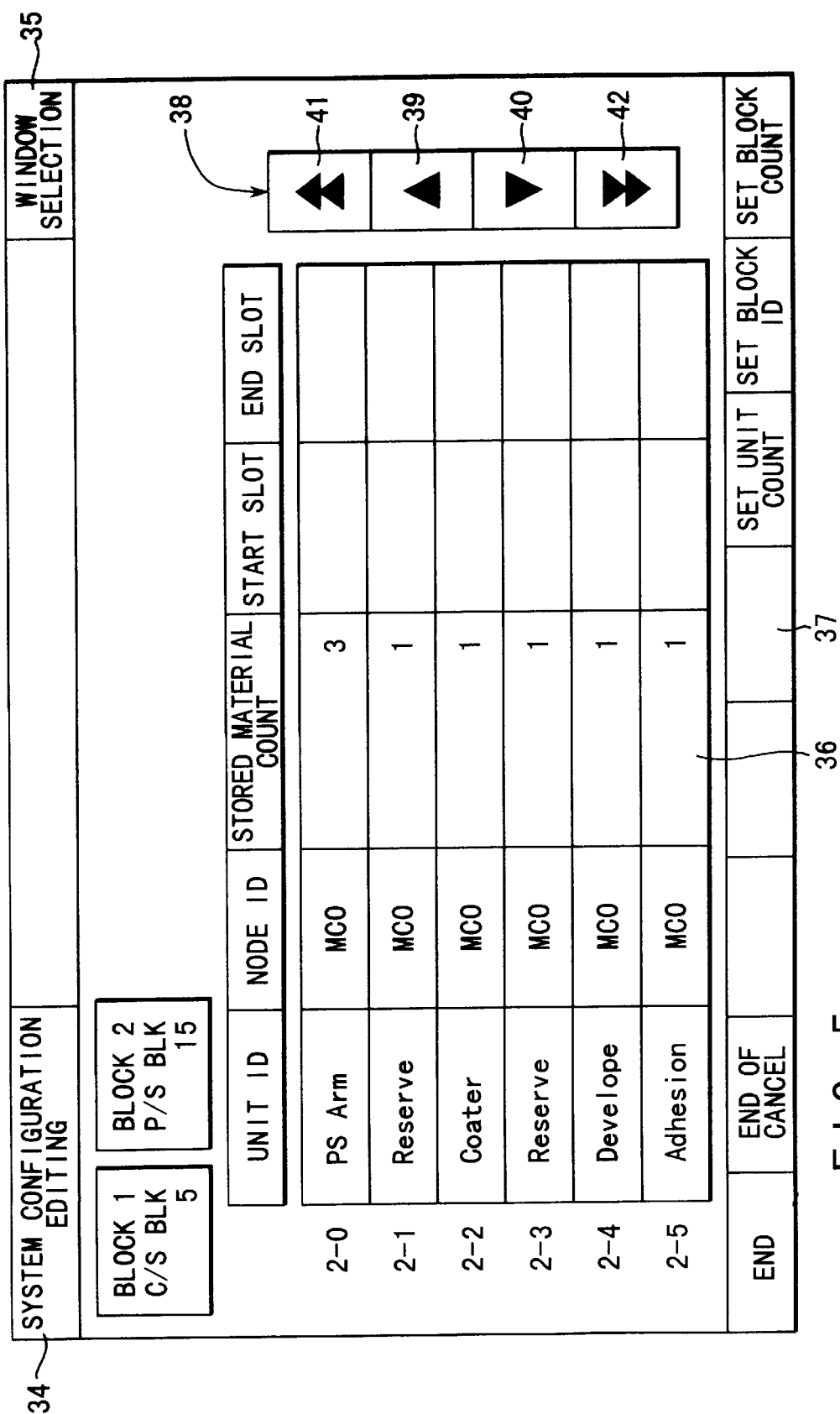
FIG. 5 is a view showing the system configuration/editing window of a display in the coating/developing process system shown in FIG. 1.
Figure 7:
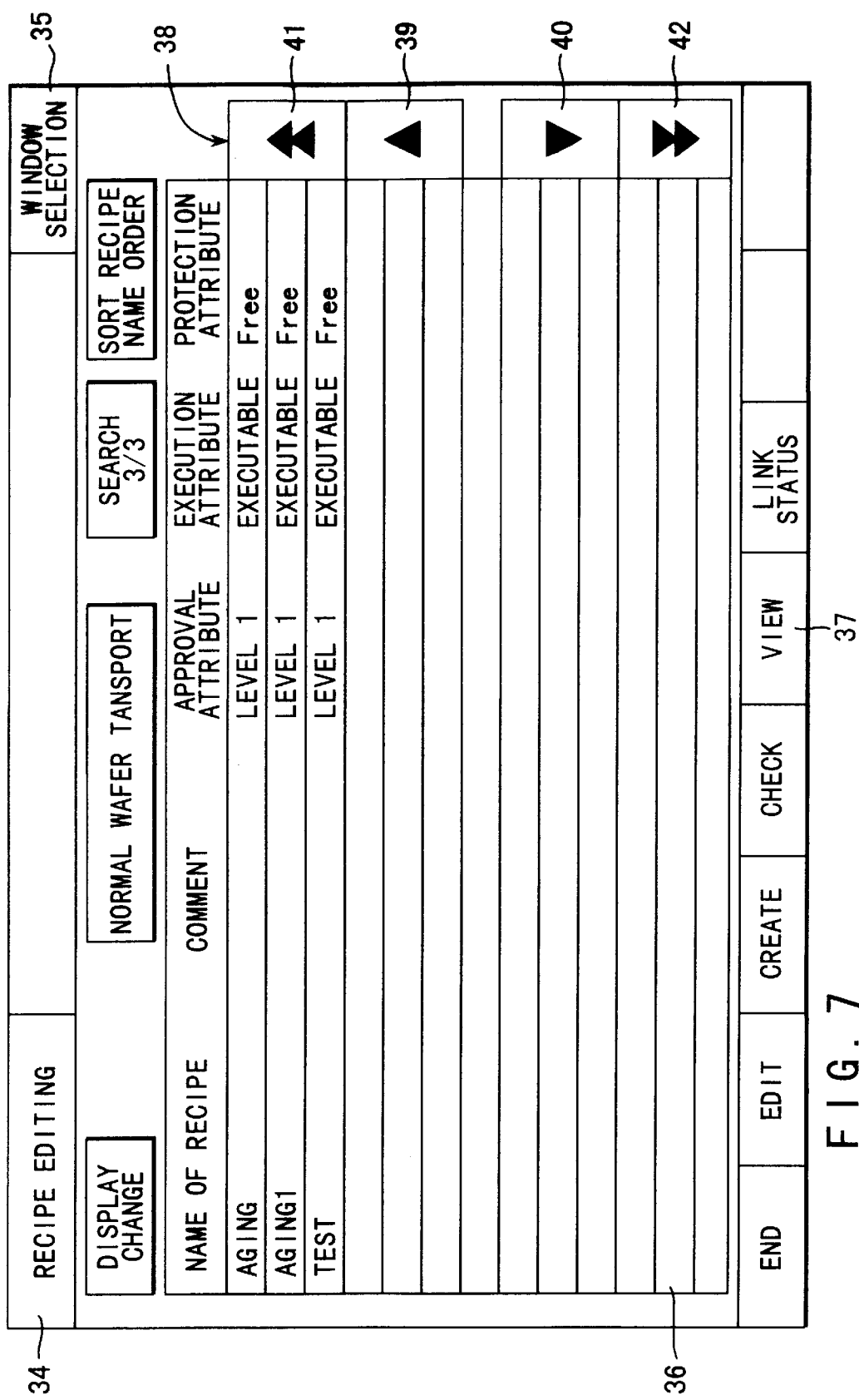
FIG. 7 is a view showing the recipe editing window of the display in the coating/developing process system shown in FIG. 1.

As shown in FIGS. 5 to 7, a title column 34 representing processing contents, a window selection button 35, a content display column 36 representing the contents in the form of a table, a command line 37, and a scroll button group 38 are displayed at the upper left end, the upper right end, almost the center, and the bottom, and the right middle portion of the screen, respectively. The scroll button group 38 includes line scroll buttons 39 and 40 and page scroll buttons 41 and 42. The page scroll button 41, the line scroll button 39, the line scroll button 40, and the page scroll button 42 are arranged downward in this order. When the user touches one button of the scroll button group 38, the display contents change as if the touched button were actually clicked on.

Figure 8:
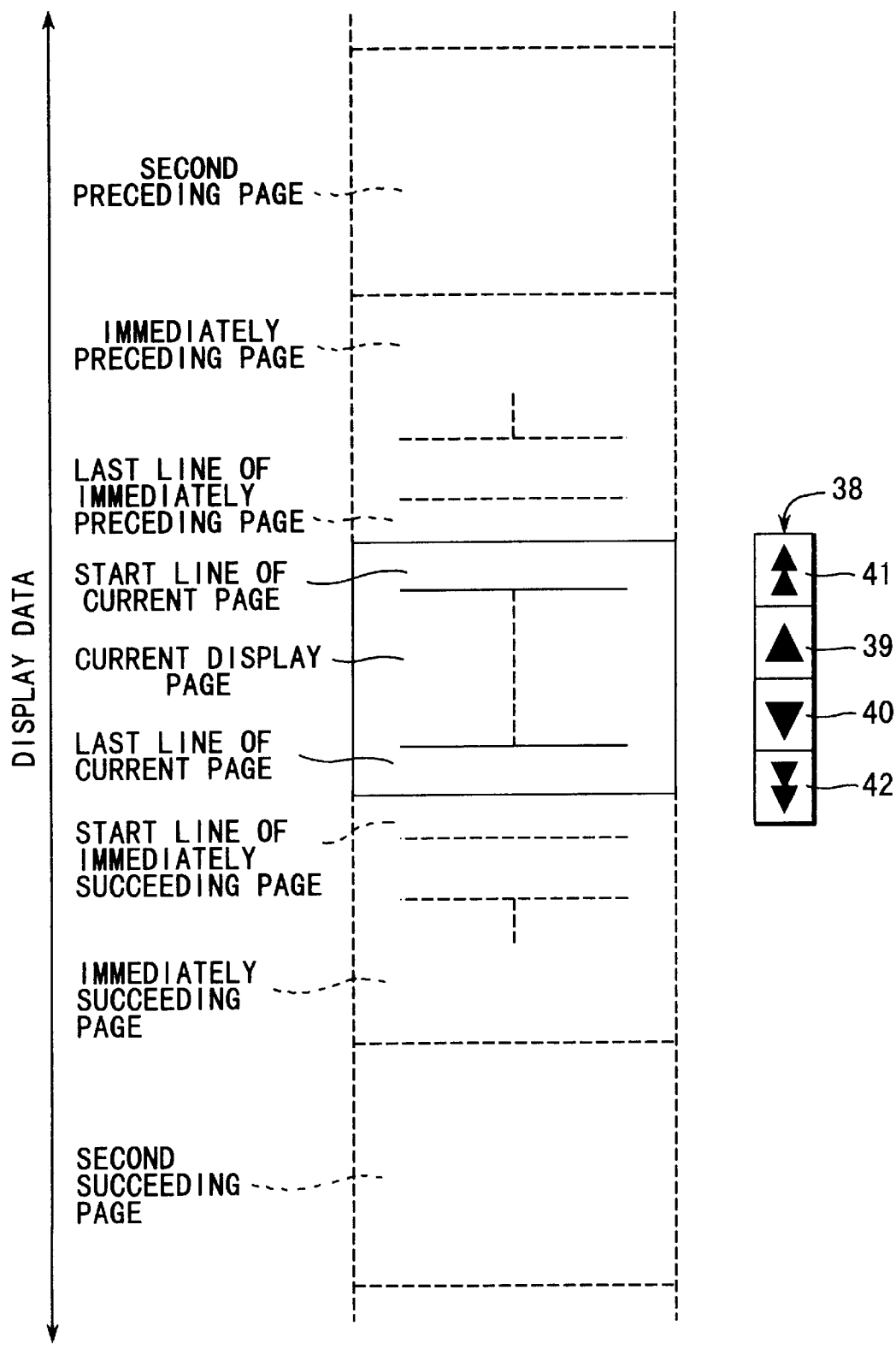
FIG. 8 is a view conceptually showing display data displayed in the content display column of the display in the coating/developing process system shown in FIG. 1.

As shown in FIG. 8, part (e.g., one page) of the display data is displayed in the content display column 36. In principle, every time the user clicks on the line scroll button 39, the lines of the immediately preceding page are scrolled and displayed. Every time the user clicks on the line scroll button 40, the lines of the immediately succeeding page are scrolled and displayed. Similarly, every time the page scroll button 41 is clicked on, the preceding pages are scrolled and displayed. Every time the page scroll button 42 is clicked on, the succeeding pages are scrolled and displayed. Assume that one of the buttons is kept clicked on. In this case, when the first period has elapsed, e.g., when 1 sec has elapsed, scrolling advances every second period, e.g., every 0.3 sec. For example, when the line scroll button 39 is kept clicked on, the lines of the immediately preceding page are sequentially scrolled and displayed.

An arrangement for realizing "scroll display" according to the present invention will be described below.

Figure 9:
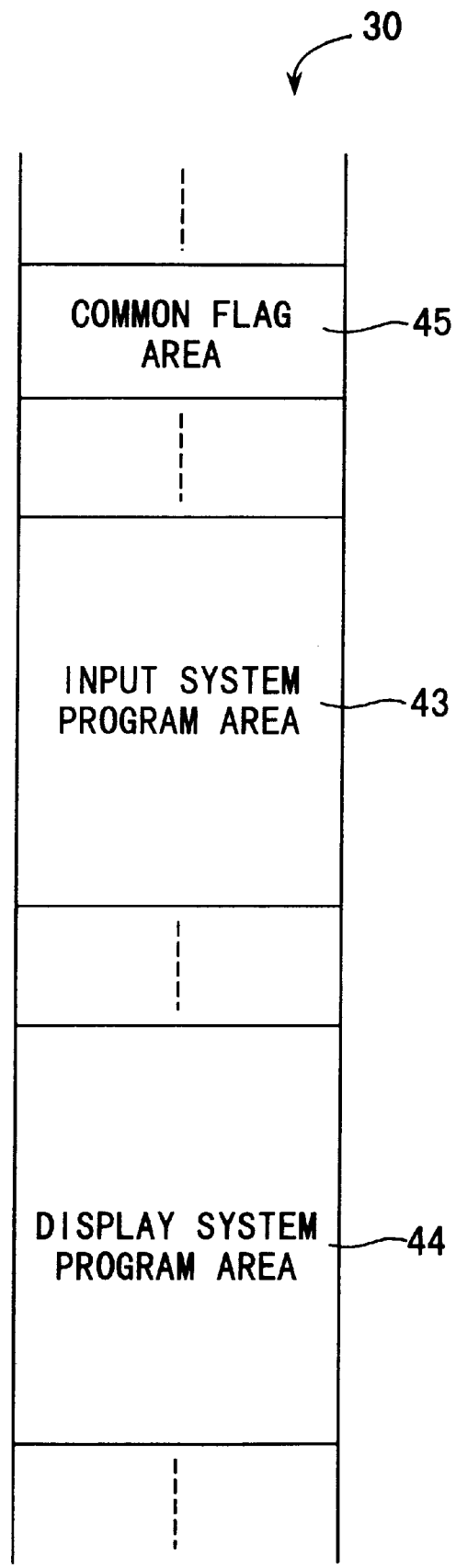
FIG. 9 is a view for explaining part of the contents of a storage in the control unit of the coating/developing system shown in FIG. 1.

FIG. 9 is a view for explaining some of the contents of the storage 30 in the control unit 28. The storage 30 has an input control program area 43 storing an input control program for performing input control of the display 26, a display control program area 44 storing a display control program for performing display control of the display system 26a of the display 26, and a flag area 45 having a flag which can be commonly recognized by the input and display control programs. The input control program is often called a touch panel driver (TPD), while the display control program is often called a man-machine interface (MMI). However, these programs need not be limited to the specific ones if the functions of the present invention can be performed.

Figure 10:
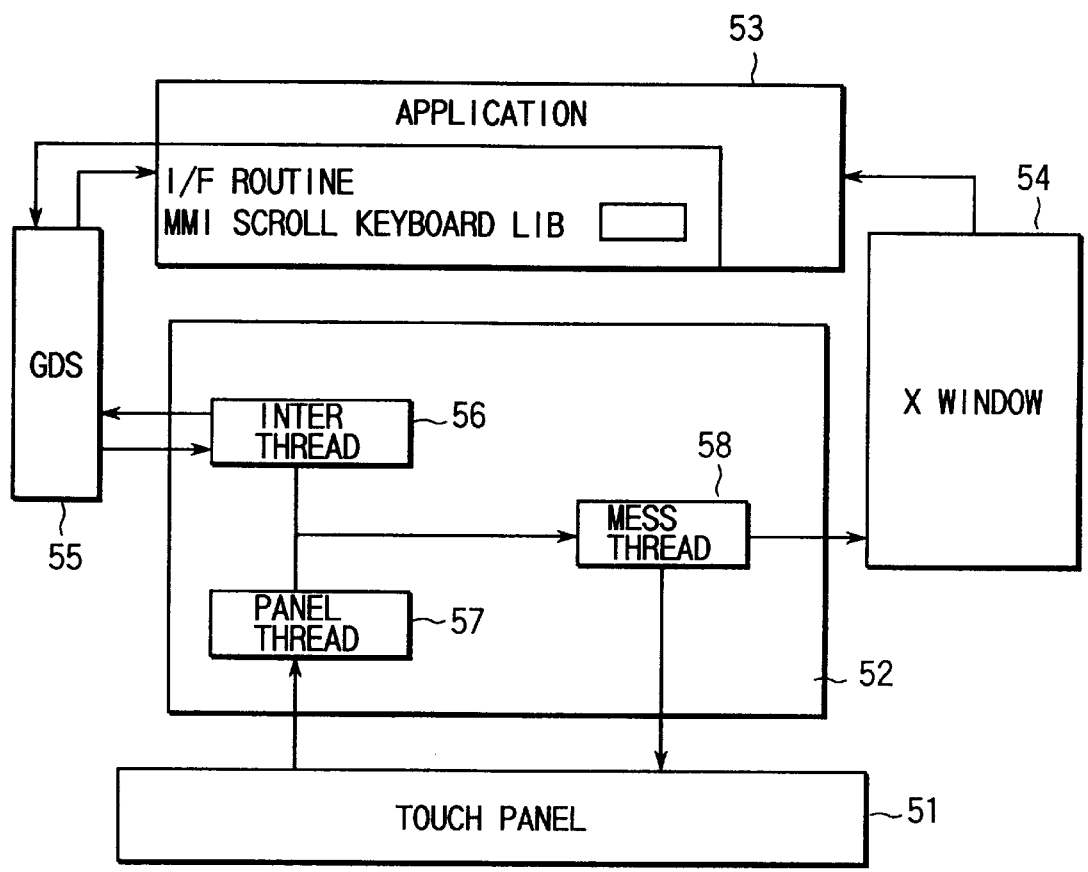
FIG. 10 is a block diagram of a display section.

FIG. 10 shows a display section comprising an application unit 53 including a touch panel 51, a touch panel driver (TPD) 52, a man-machine interface (MMI), X-window 54 and GDS (global data system) 55.

The touch panel driver 52 provides with a mess thread circuit 58, a panel thread circuit 57 and an inter thread circuit 56. The mess thread circuit 58 receives messages from the panel thread circuit 57 and the inter thread circuit 56 and sends the message to the application unit 53 and touch panel 51. The panel thread circuit 57 receives data from the touch panel 51 and sends it to the mess thread circuit 58. Also, the inter thread circuit 56 performs the control for continuous input of the scroll button and the control for decrease of the interval time of the keyboard screen.

Figure 11:
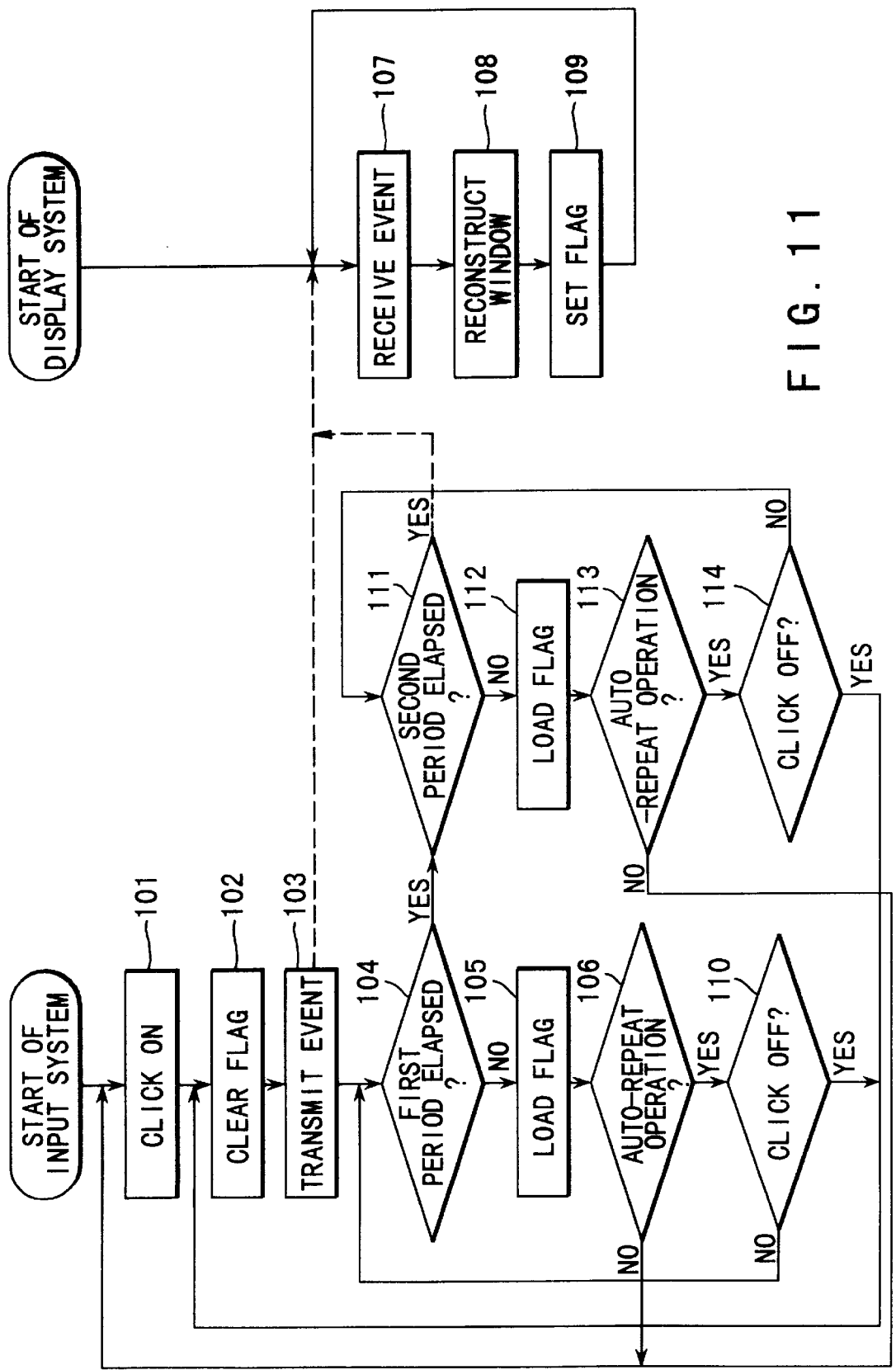
FIG. 11 is a flow chart showing the operations of an input control program and a display control program in the control unit of the coating/developing system shown in FIG. 1.

FIG. 11 is a flow chart showing the operations of the input and display control programs. Steps 101 to 106 and steps 110 to 114 show the operation of the input control program, while steps 107 to 109 show the operation of the display control program.

Assume that the line scroll button 39 is kept clicked on for a predetermined period. When the line scroll button 39 is clicked on, the input control program detects this click-on (step 101) and determines whether the flag in the flag area 45 is to be reset (flag clear). For a button click-on (start of input period, i.e., start of first period), the flag operation (step 102) is neglected, and the button lick-on is transmitted to the display control program (step 103).

Upon reception of the button depression (step 107), the display control program reconstructs the window on the display 26 (step 108). In this case, the window is reconstructed as if the line scroll button 39 were actually depressed. The display control program then sets the flag of the flag area 45 (step 109).

After transmitting the button click-on event to the display control program as described above (step 103), the input control program determines whether the first period has elapsed (step 104). If NO in step 104, the input control program loads the flag of the flag area 45 (step 105) and determines whether an auto-repeat operation according to the present invention is to be performed (step 106). That is, when the flag of the flag area 45 is set, the auto-repeat operation is performed; otherwise, the auto-repeat operation is not performed. The auto-repeat operation will be described in detail later.

If NO in step 106, the flow returns to click-on step 101. If YES in step 106, it is determined whether the button is clicked off (step 110). If NO in step 110, the flow returns to step 104; otherwise, the flow returns to step 102. In step 102, the flag is cleared, and event transmission step 103 is neglected. It is determined in step 104 whether the first period has elapsed. If NO in step 104, the flag is loaded in step 105, and the flow advances to step 106. At this time, since the flag has been cleared, NO is determined in the auto-repeat operation determination step 106, and the flow returns to step 101. That is, the window is not reconstructed even if the button is clicked on a plurality of number of times within the first period.

If YES in step 104, i.e., when it is determined that the first period has elapsed, it is determined whether the second period has elapsed (step 111). If NO in step 111, the flag of the flag area 45 is loaded (step 112), and it is determined whether the auto-repeat operation is to be performed (step 113).

If NO in step 113, the flow returns to click-on step 101; otherwise, it is determined whether the button is clicked off (step 114). If YES in step 114, the flow returns to step 102; otherwise, the flow returns to step 111.

In step 102, the flag is cleared, and event transmission step 103 is neglected. It is determined in step 104 whether the first period has elapsed.

Since the first period has already elapsed, YES is obtained in step 104. It is then determined in step 111 whether the second period has elapsed. If NO in step 111, the flag is loaded in step 112, and the flow advances to step 113. At this time, since the flag has already been cleared, NO is obtained in auto-repeat operation determination step 113, and the flow returns to step 101. That is, no window reconstruction is performed even if the button is clicked a plurality of number of times within the second period. The same window as in the first period is constructed before the first elapse of the second period.

If YES in step 111, that is, when the first elapse of the second period is determined, the flow advances to step 108. In step 108, the same window as in the first period before the first elapse of the second period is reconstructed into a next window.

In the above operation, when the line scroll button 39 is clicked off upon the elapse of the predetermined period, the input control program inputs this as a button click-off event (step 110) and determines whether the flag of the flag area 45 is to be reset (flag clear). For the button click-off event (end of input period), the flag is reset (step 102), and the button click-off event is transmitted to the display control program (step 103).

Upon reception of the button click-off event (step 107), the display control program reconstructs the window on the display 26 (step 108). In this case, the window is reconstructed as if the line scroll button 39 were actually clicked off. The display control program then determines whether the flag of the flag area 45 is to be set. For the button click-off event, the operation for the flag of the flag area 45 is neglected (step 109).

In the same manner as described above, the input control program transmits the button click-off event to the display control program (step 103), confirms whether the first period has elapsed (step 104), loads the flag of the flag area 45 (step 105), and determines whether to perform the auto-repeat operation (step 106).

Consequently, the following operations have been performed.

(1) The flag of the flag area 45 is kept set during click-on of the button, and the flag is kept reset during the period except click-on of the button.

(2) When the button is touched with a fingertip on the screen, the display contents change as if the button were actually clicked on; when the button on the screen is clicked off, the display contents change as if the button were actually clicked off.

According to the above display operation, the event transmission based on continuous click-on, basically, is performed by the inter thread circuit 56, while the event transmission based on no continuous click-on is performed by the panel thread circuit 57.

Upon clicking on, data is transmitted from the panel thread circuit 57 to the mess thread circuit 58. When the click-off is performed within the first period, data is transmitted from the panel thread circuit 57 to the mess thread circuit 58. If the click-off is not performed within the first period, data is transmitted from the inter thread circuit 56 to the mess thread circuit 58. Thereafter, if the click-off is not performed within the second period, data is transmitted from the inter thread circuit 56 to the mess thread circuit 58.

Figure 12:
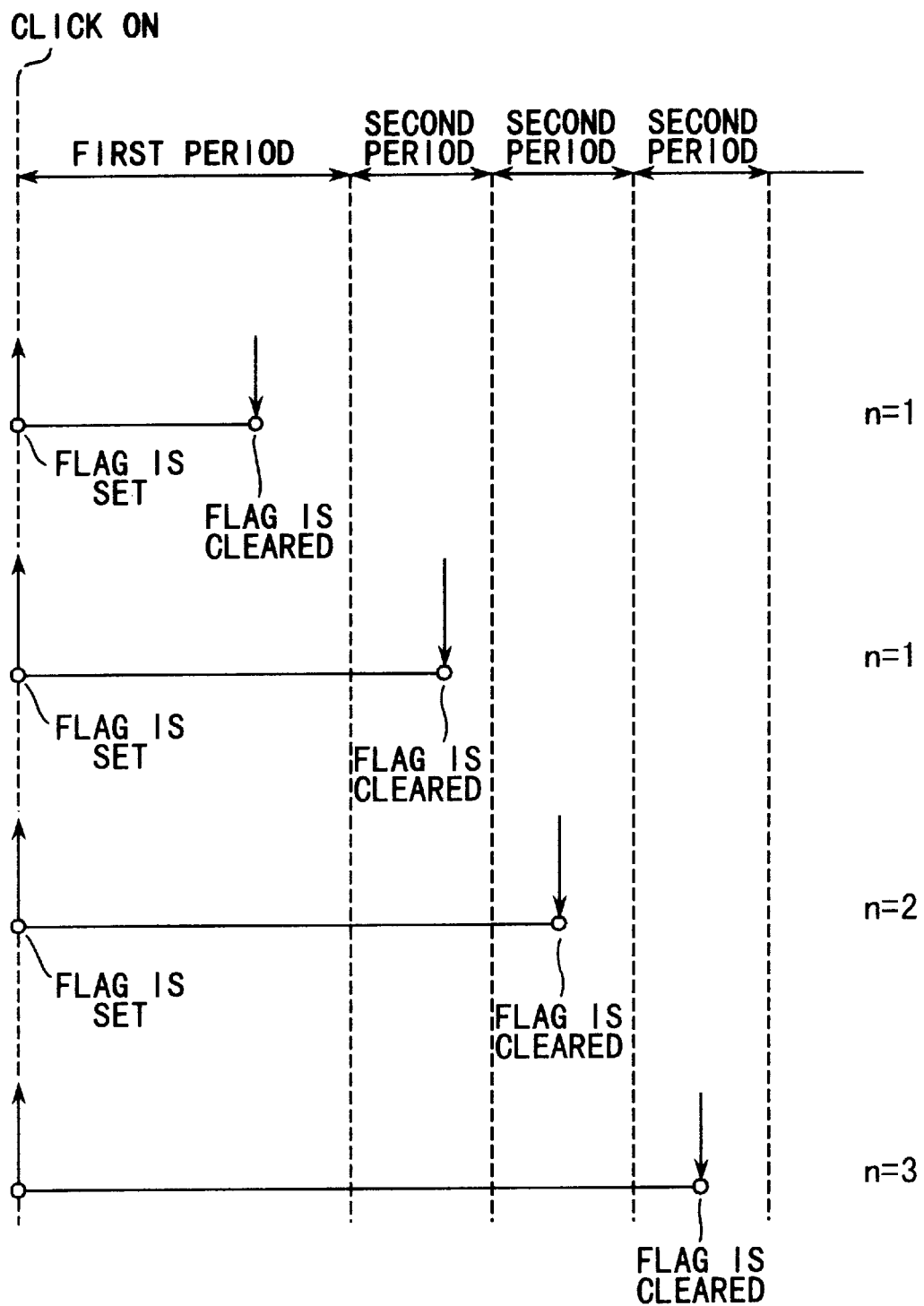
FIG. 12 is a view for explaining an auto-repeat operation in the display of the coating/developing system shown in FIG. 1.

FIG. 12 is a view for explaining the auto-repeat operation.

More specifically, in this operation, the flag of the flag area 45 is loaded, the elapse of the first period, e.g., 0.7 sec from the start (button click-on) of the input period is detected on the basis of this flag, and at the same time the elapse of the second period, e.g., 0.3 sec upon the elapse of the first period is repeatedly detected. When the end (button click-off) of the input period is detected before the first elapse (within one sec in this embodiment) of the second period, button click-on is regarded to be performed once. As a result, the last line of the immediately preceding page moves down and is displayed in the window.

When the input period, however, continues (one or more sec in this embodiment), the last line of the immediately preceding page moves down and is displayed in the window every time the second period, e.g., 0.3 sec has elapsed.

More specifically, as shown in FIG. 12, (1) when he button is clicked off within the first period, the display contents move down by one line; (2) when the button is clicked off before the first elapse of the second period upon the elapse of the first period, the display contents move down by one line; (3) when the button is clicked off before the second elapse of the second period after the first elapse of the second period, the display contents move down by two lines; and (4) when the button is clicked off before the third elapse of the second period after the second elapse of the second period, the display contents move down by three lines.

In this embodiment, the operations performed upon click-on of the line scroll button 39 are exemplified.

However, similar operations can be performed when the line scroll button 40, the page scroll button 41, or the page scroll button 42 is clicked on.

In the touch panel type display apparatus in the coating/developing process system 1 to which the present invention is applied, the line scroll button 39 or 40, or the page scroll button 41 or 42 is kept clicked on to continuously scroll a plurality of lines or pages, thereby facilitating scrolling. In addition, even if such a button is clicked on, continuous scrolling does not start until the first elapse (e.g., one sec) of the second period. Even if a wrong button is clicked on a plurality of number of times consecutively, scrolling does not inadvertently continue. In particular, the coating/developing process system 1 of this embodiment has a large number of processes because the resist coating process combines with the developing process. For this reason, the table displayed on the display is considerably long and often requires continuous scrolling. When the present invention is applied to this coating/developing process system 1, operation simplification results in an enhanced effect.

In the above embodiment, the first and second periods are set as 0.7 sec and 0.3 sec, respectively. However, other lengths of time can be used. When the first period is set longer than the second period, scrolling matching the human sense can be achieved. However, the first period may be set equal to the second period. Alternatively, the second period may be set longer than the first period, or the second period need not be a fixed period. For example, when the second period is set to gradually shorten, the scroll speed can be gradually increased with an increase in the elapse of click-on time.

In the above embodiment, the input control program, the display control program, and the flag area are provided to realize the present invention. However, these programs may be unified to realize the present invention.

As has been described above, according to the present invention, an input control apparatus comprises an input detector for detecting a start and end of an input period, and a period detector for detecting an elapse of a first period from the start of the input period and repeatedly detecting an elapse of a second period upon the elapse of the first period, wherein it is determined that an input is complete with only one input operation when the end of the input period is detected before the first elapse of the second period, and it is determined that an input operation is made every elapse of the second period when the input period continues. A smooth, continuous input operation is allowed while preventing an operation error caused by consecutive click-ons.

According to the present invention, the input control unit comprises an input detector for detecting a start and end of an input period, a notification circuit for notifying the display control unit of a detection result of the input detector, a period detector for detecting an elapse of a first period from the start of the input period and repeatedly detecting an elapse of a second period shorter than the first period upon the elapse of the first period, and a determining circuit for determining that an input is complete with only one input operation when the end of the input period is detected before the first elapse of the second period, and determining that an input operation is made every elapse of the second period when the input period continues, and the display control unit comprises a reception circuit for receiving notification of the detection result from the input control unit and a controller for controlling display in accordance with the received notification of the detection result. Even if the input control unit and display control unit are present separately, a smooth, continuous input operation is allowed while preventing an operation error caused by consecutive click-ons.

In addition, according to the present invention, the input control unit comprises an input detector for detecting a start and end of an input period, a reflecting circuit for reflecting a detection result of the input detection means on the flag area, a notification circuit for notifying the display control unit of the detection result, a period detector for detecting an elapse of a first period from the start of the input period on the basis of a recognition result of the flag area and repeatedly detecting an elapse of a second period shorter than the first period upon the elapse of the first period on the basis of the recognition result of the flag area, and a determining circuit for determining that an input is complete with only one input operation when the end of the input period is detected before the first elapse of the second period, and determining that an input operation is made every elapse of the second period when the input period continues, and the display control unit comprises a reception circuit for receiving notification of the detection result from the input control unit, a controller for controlling display in accordance with the received notification of the detection result, and a reflecting circuit for reflecting the received detection result on the flag area. Even if the input control unit and the display control unit are present separately and the input and display control units have a common recognizable flag area, a smooth, continuous input operation is allowed by properly using the flag area while preventing an operation error caused by consecutive click-ons.

According to the present invention, in the touch panel type display for displaying input buttons and performing scrolling in accordance with the number of times of inputs to each input button, a smooth, continuous input operation is allowed while preventing an operation error caused by consecutive click-ons. As a result, according to the present invention, smooth scrolling of a plurality of lines or pages is allowed. High-speed scrolling of a plurality of lines or pages is also allowed, and a desired portion can be appropriately displayed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An input control apparatus comprising:
a touch panel provided on a display and configured for inputting data;
an input detection section configured for detecting a start and end of a data input period for inputting the data from said touch panel; and
a neglecting section configured for neglecting second and subsequent inputs within the input period;
wherein said touch panel includes a scroll button for designating scrolling on a display, said input detection section comprises means for detecting click-on and click-off of said scroll button as the start and end of the data input period, and said neglecting section comprises means for neglecting second and subsequent operations of said scroll button within the input period.

2. An input control apparatus comprising:
a touch panel configured for inputting data;
an input detector configured for detecting a start and end of an input period for inputting data from said touch panel;
a period detection section configured for detecting an elapse of a first period from the start of the input period and repeatedly detecting an elapse of a second period upon the elapse of the first period; and
an input updating section configured for, when the end of the input period is detected before a first elapse of the second period, recognizing detection of the end of the input period as one input completion cycle, and when the input period continues after the first elapse of the second period, recognizing an input completion cycle every time the second period has elapsed.

3. An apparatus according to claim 2, wherein said touch panel includes a scroll button for designating scrolling on a display, said input detection section comprises means for detecting click-on and click-off of said scroll button as the start and end of the data input period, and said input updating section comprises means for neglecting second and subsequent operations of said scroll button within the first and second periods.

4. An apparatus according to claim 3, wherein said period detection section includes means for setting the first period at 0.7 second, and the second period at 0.3 second.

5. A display control apparatus for controlling a display device having input means and display means, comprising:
an input control unit configured for controlling said input means of said display device; and
a display control unit configured for controlling said display means of said display device,
wherein said input control unit comprises
an input detection section configured for detecting a start and end of an input period,
a notification section configured for notifying said display control unit of a detection result of said input detection section,
a period detection section configured for detecting an elapse of a first period from the start of the input period and repeatedly detecting an elapse of a second period shorter than the first period upon the elapse of the first period; and
an input updating section configured for, when the end of the input period is detected before a first elapse of the second period, recognizing detection of the end of the input period as one input completion cycle, and when the input period continues after the first elapse of the second period, recognizing an input completion cycle every time the second period has elapsed, and said display control unit comprises
a receiver section configured for receiving notification of the detection result from said input control system, and
a control section configured for controlling display in accordance with the received notification of the detection result.

6. An apparatus according to claim 5, wherein said input means comprises a touch panel having a scroll button for designating scrolling on said display device, said input detection section comprises means for detecting click-on and click-off of said scroll button as the start and end of the data input period, and said input updating section comprises means for neglecting second and subsequent operations of said scroll button within the first and second periods.

7. An apparatus according to claim 5, wherein said period detection section includes means for setting the first period at 0.7 second, and the second period at 0.3 second.

8. A display apparatus comprising:
a touch panel type display having an input touch panel and a display panel;
an input control unit configured for controlling said input touch panel of said display;
a display control unit configured for controlling said display panel of said display; and
a flag area which can be commonly recognized by said input and display control units,
wherein said input control unit comprises
input detection means for detecting a start and end of an input period for said display;
means for reflecting a detection result of said input detection means on said flag area,
notification means for notifying said display control unit of the detection result,
period detection means for detecting an elapse of a first period from the start of the input period on the basis of a recognition result of said flag area and repeatedly detecting an elapse of a second period shorter than the first period upon the elapse of the first period on the basis of the recognition result of said flag area; and
input updating means for, when the end of the input period is detected before a first elapse of the second period, recognizing detection of the end of the input period as one input completion cycle, and when the input period continues after the first elapse of the second period, recognizing an input completion cycle every time the second period has elapsed, and
said display control unit comprises
reception means for receiving notification of the detection result from said input control system,
control means for controlling display in accordance with the received notification of the detection result, and
means for reflecting the received detection result on said flag area.

9. An apparatus according to claim 8, wherein said input means comprises a touch panel having a scroll button for inputting data for designating scrolling on said display device, said input detection means comprises means for detecting click-on and click-off of said scroll button as the start and end of the data input period, and said input updating means comprises means for neglecting second and subsequent operations of said scroll button within the first and second periods.

10. An apparatus according to claim 8, wherein said period detection means includes means for setting the first period at 0.7 second, and the second period at 0.3 second.

11. A display apparatus comprising:
a touch panel type display having an input touch panel and a display panel;
an input control unit configured for controlling said input touch panel of said display;
a display control unit configured for controlling said display panel of said display; and
a flag area which can be commonly recognized by said input and display control units,
wherein said input control unit comprises
input detection means for detecting a start and end of an input period for said display;
means for reflecting a detection result of said input detection means on said flag area when the end of the input period is detected,
notification means for notifying said display control unit of the detection result,
period detection means for detecting an elapse of a first period from the start of the input period on the basis of a recognition result of said flag area and repeatedly detecting an elapse of a second period shorter than the first period upon the elapse of the first period on the basis of the recognition result of said flag area; and
input updating means for, when the end of the input period is detected before a first elapse of the second period, recognizing detection of the end of the input period as one input completion cycle, and when the input period continues after the first elapse of the second period, recognizing an input completion cycle every time the second period has elapsed, and
said display control unit comprises
reception means for receiving notification of the detection result from said input control system,
control means for controlling display in accordance with the received notification of the detection result, and
means for reflecting the received detection result on said flag area when the received detection result represents the start of the input period.

12. An apparatus according to claim 11, wherein said touch panel has a scroll button for inputting data for designating scrolling on said display device, said input detection means comprises means for detecting click-on and click-off of said scroll button as the start and end of the data input period, and said input updating means comprises means for neglecting second and subsequent operations of said scroll button within the first and second periods.

13. An apparatus according to claim 11, wherein said period detection means includes means for setting the first period at 0.7 second, and the second period at 0.3 second.

14. A display apparatus comprising:
a touch panel type display capable of displaying an input button and performing scrolling in accordance with an input count of said input button;
an input control unit configured for input control of said display;
a display control unit configured for performing display control of said display; and
a flag area which can be commonly recognized by said input and display control units,
wherein said input control unit comprises
input detection means for detecting a start and end of an input period for said display;
means for resetting said flag of said flag area when the end of the input period is detected,
notification means for notifying said display control unit of the detection result,
period detection means for detecting an elapse of a first period from the start of the input period on the basis of a recognition result of said flag area and repeatedly detecting an elapse of a second period shorter than the first period upon the elapse of the first period on the basis of the recognition result of said flag area; and input updating means for, when the end of the input period is detected before a first elapse of the second period, recognizing detection of the end of the input period as one input completion cycle, and when the input period continues after the first elapse of the second period, recognizing an input completion cycle every time the second period has elapsed, and said display control unit comprises reception means for receiving notification of the detection result from said input control system, control means for controlling display in accordance with the received notification of the detection result, and means for setting said flag of said flag area when the received detection result represents the start of the input period.

15. An apparatus according to claim 14, wherein said input button has a scroll button for designating scrolling on said display device, said input detection means comprises means for detecting click-on and click-off of said scroll button as the start and end of the data input period, and said input updating means comprises means for neglecting second and subsequent operations of said scroll button within the first and second periods.

16. An apparatus according to claim 14, wherein said period detection means includes means for setting the first period at 0.7 second, and the second period at 0.3 second.

17. An input control apparatus comprising:

an input section configured for inputting data;

an input detection section configured for detecting a start and end of a data input period for inputting the data from said input section; and a neglecting section configured for neglecting second and subsequent inputs within the input period, wherein said input section includes a touch panel having a scroll button for designating scrolling on a display, said input detection section comprises means for detecting click-on and click-off of said scroll button as the start and end of the data input period, and said neglecting section comprises means for neglecting second and subsequent operations of said scroll button within the input period.

18. An input control apparatus comprising:

an input section configured for inputting data;

an input detection section configured for detecting a start and end of an input period for inputting data from said input section;

a period detection section configured for detecting an elapse of a first period from the start of the input period and repeatedly detecting an elapse of a second period upon the elapse of the first period; and an input updating section configured for, when the end of the input period is detected before a first elapse of the second period, recognizing detection of the end of the input period as one input completion cycle, and when the input period continues after the first elapse of the second period, recognizing an input completion cycle every time the second period has elapsed, and wherein said input section includes a scroll button for designating scrolling on a display, said input detection section comprises means for detecting click-on and click-off of said scroll button as the start and end of the data input period, and said input updating section comprises means for neglecting second and subsequent operations of said scroll button within the first and second periods.

19. An apparatus according to claim 18, wherein said period detection section includes means for setting the first period at 0.7 second, and the second period at 0.3 second.

* * * * *